United States Patent
Takai

(10) Patent No.: US 9,748,785 B2
(45) Date of Patent: Aug. 29, 2017

(54) STORAGE STATUS ADJUSTING CIRCUIT, STORAGE STATUS ADJUSTING DEVICE, STORAGE BATTERY PACK AND SWITCH CIRCUIT CONTROLLING METHOD

(71) Applicant: Masami Takai, Tokyo (JP)

(72) Inventor: Masami Takai, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 191 days.

(21) Appl. No.: 14/636,360

(22) Filed: Mar. 3, 2015

(65) Prior Publication Data

US 2015/0256020 A1    Sep. 10, 2015

(30) Foreign Application Priority Data

Mar. 4, 2014   (JP) .................................. 2014-041558

(51) Int. Cl.
    *H02J 7/00*    (2006.01)

(52) U.S. Cl.
    CPC .......... *H02J 7/0068* (2013.01); *H02J 7/0014* (2013.01); *H02J 7/0018* (2013.01); *H02J 7/0019* (2013.01)

(58) Field of Classification Search
    CPC .............................. H02J 7/0068; H02J 7/0018
    USPC .................................................. 320/134, 118
    See application file for complete search history.

(56) References Cited

U.S. PATENT DOCUMENTS

| 5,631,534 A * | 5/1997 | Lewis ................. H01M 10/441 320/103 |
|---|---|---|
| 6,373,223 B1 | 4/2002 | Anzawa et al. |
| 6,841,971 B1 * | 1/2005 | Spee ..................... H01M 10/44 320/119 |
| 8,164,305 B2 | 4/2012 | Zhang et al. |

(Continued)

FOREIGN PATENT DOCUMENTS

| JP | 2002-223528 | 8/2002 |
|---|---|---|
| JP | 2011-083182 | 4/2011 |
| JP | 2013-013268 | 1/2013 |

OTHER PUBLICATIONS

European search report dated Jul. 24, 2015 in corresponding European Patent Application No. 15157436.5.

(Continued)

*Primary Examiner* — Richard Isla Rodas
*Assistant Examiner* — Dung V Bui
(74) *Attorney, Agent, or Firm* — Cooper & Dunham LLP

(57) ABSTRACT

A storage status adjusting circuit includes a first switching unit configured to switch between energy accumulation in a first coil and energy release from the first coil to any one of electric storage devices in a first assembled electric storage device having a plurality of the electric storage devices, a second switching unit configured to switch between energy accumulation in a second coil and energy release from the second coil to any one of the electric storage devices in a second assembled electric storage device having a plurality of the electric storage devices, and a changing unit configured to change a potential difference between both ends of (Continued)

the first coil and a potential difference between both ends of the second coil based on storage statuses of the first assembled electric storage device and the second assembled electric storage device, when energy is accumulated in the first coil and the second coil.

14 Claims, 6 Drawing Sheets

(56) References Cited

U.S. PATENT DOCUMENTS

| | | | |
|---|---|---|---|
| 8,436,582 B2 * | 5/2013 | Pigott | H02J 7/0018 320/118 |
| 2010/0244781 A1 * | 9/2010 | Kramer | H02J 7/0016 320/162 |
| 2012/0013194 A1 | 1/2012 | Yamanoue | |
| 2012/0212182 A1 * | 8/2012 | Li | H02J 7/0019 320/116 |
| 2012/0299545 A1 * | 11/2012 | Kuraishi | H02J 7/0055 320/112 |
| 2013/0002203 A1 | 1/2013 | Kuraishi | |
| 2013/0020982 A1 | 1/2013 | Mercier et al. | |
| 2013/0057198 A1 * | 3/2013 | Gerlovin | H02J 7/0019 320/103 |
| 2013/0187612 A1 * | 7/2013 | Aiura | H01M 10/44 320/118 |
| 2013/0320914 A1 * | 12/2013 | Li | H02J 7/0016 320/103 |
| 2014/0009092 A1 * | 1/2014 | Ma | B60L 11/1866 320/107 |

OTHER PUBLICATIONS

Hongrui Liu et al., "An Efficient Battery Balancing Scheme in Electric Vehicle". International Conference on Materials for Renewable Energy and Environment, IEEE, vol. 2, Aug. 19, 2013.

Nov. 28, 2016 European official action in connection with corresponding European patent Application No. 15157436.5.

* cited by examiner

STORAGE STATUS ADJUSTING CIRCUIT, STORAGE STATUS ADJUSTING DEVICE, STORAGE BATTERY PACK AND SWITCH CIRCUIT CONTROLLING METHOD

BACKGROUND OF THE INVENTION

1. Field of the Invention

The present technology relates to a storage status adjusting circuit, a storage status adjusting device, a storage battery pack and a switch circuit controlling method with respect to a storage means capable of charge and discharge.

2. Description of the Related Art

A storage battery pack, having a plurality of secondary batteries (cells) connected in series, which has an electronic circuit to average cell voltages of the cells, has been known. As for averaging cell voltages, an active method, in which electricity is transferred between the cells, is gathering attention. An electronic circuit adopting the active method has a transformer and a switching element for activating the transformer, accumulates electricity in a primary coil during the times the switching element is turned on, and outputs electricity accumulated in the primary coil when the switching element is turned off.

An averaging of cell voltages in secondary batteries is performed by repeating such operation to provide a cell connected with a secondary coil with electricity, in an electronic circuit adopting the active method (for example, Japanese Laid-open Patent Publication No. 2002-223582).

However, in an electronic circuit adopting the active method, energy-loss by the transformer is large.

RELATED ART DOCUMENT

Patent Document

[Patent Document 1]: Japanese Laid-open Patent Publication No. 2002-223528
[Patent Document 2]: Japanese Laid-open Patent Publication No. 2011-83182
[Patent Document 3]: Japanese Laid-open Patent Publication No. 2013-13268

SUMMARY OF THE INVENTION

An object of disclosure of the present technology is to reduce energy-loss.

The following configuration is adopted to achieve the aforementioned object.

In one aspect of the embodiment, a storage status adjusting circuit includes a first switching unit configured to switch between energy accumulation in a first coil and energy release from the first coil to any one of electric storage devices in a first assembled electric storage device having a plurality of the electric storage devices, a second switching unit configured to switch between energy accumulation in a second coil and energy release from the second coil to any one of the electric storage devices in a second assembled electric storage device having a plurality of the electric storage devices, and a changing unit configured to change a potential difference between both ends of the first coil and a potential difference between both ends of the second coil based on storage statuses of the first assembled electric storage device and the second assembled electric storage device, when energy is accumulated in the first coil and the second coil.

Other objects, features and advantages of the present invention will become more apparent from the following detailed description when read in conjunction with the accompanying drawings.

DETAILED DESCRIPTION OF THE PREFERRED EMBODIMENTS

Figure 1:
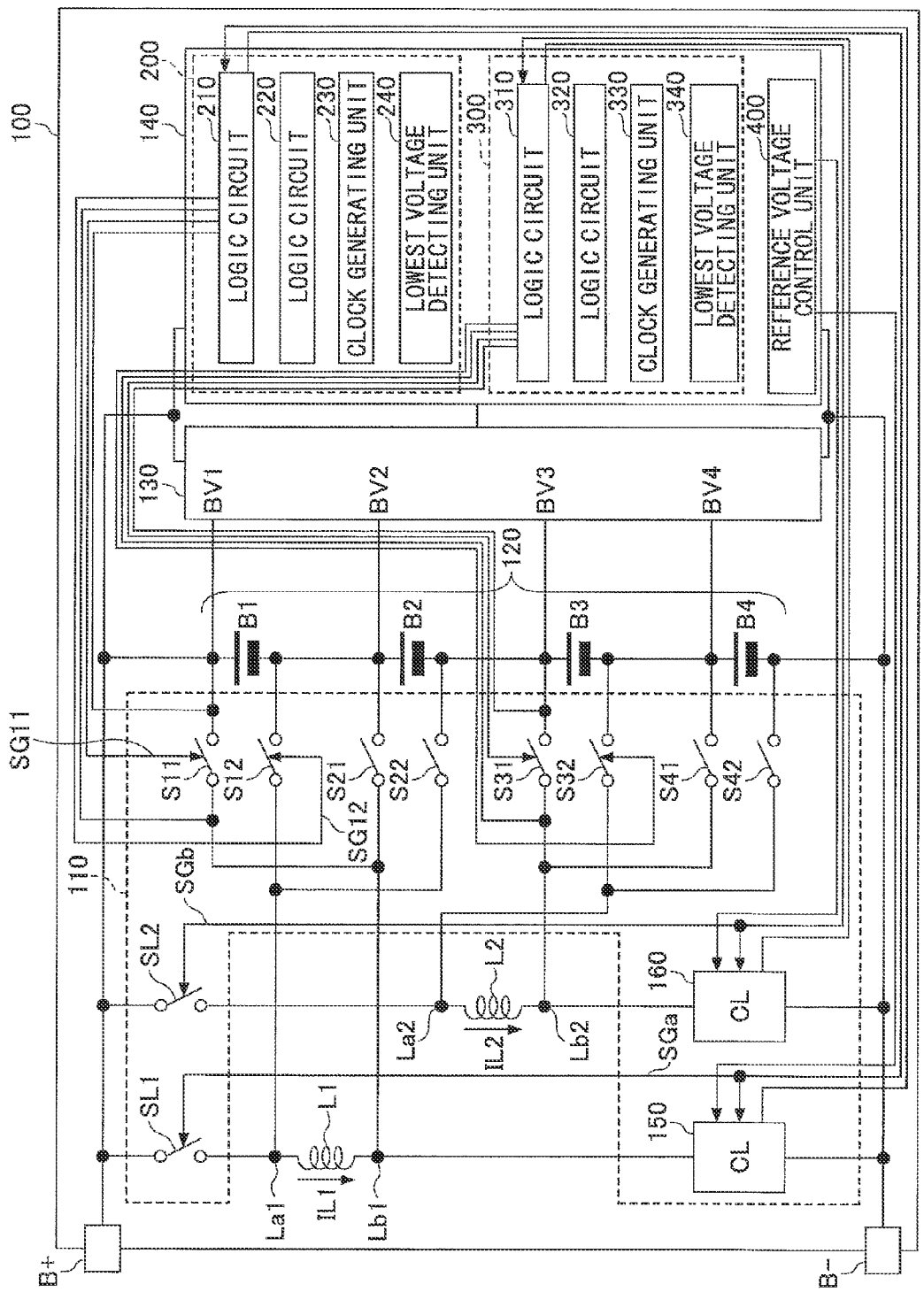
FIG. 1 is an illustrative drawing for illustrating a storage battery pack.

Herein below, embodiments will be described with reference to the accompanying drawings. FIG. 1 is an illustration diagram of a storage battery pack.

A storage battery pack 100 of the present embodiment includes a B+ terminal, a B− terminal, a coil L1, a coil L2, a storage status adjusting circuit 110, an assembled battery 120, a cell voltage detecting circuit 130, and a controller 140.

The storage status adjusting circuit 110 of the present embodiment performs averaging of cell voltages in a plurality of secondary batteries included in the assembled battery 120, and adjusts a status of electric energy storage (i.e. storage status) in each of the secondary batteries.

The storage battery pack 100 of the present embodiment supplies electricity accumulated in the assembled battery 120 to a load connected through the B+ terminal and the B− terminal. Also, the storage battery pack 100 of the present embodiment charges the secondary batteries in the assembled battery 120 by a battery charger connected through the B+ terminal and the B− terminal.

In addition, the storage battery pack 100 of the present embodiment divides the secondary batteries in the assembled battery 120 storage into plural groups, and adjusts storage status of the secondary batteries on the group basis. In the present embodiment, the storage status of the secondary batteries in the assembled battery 120 can be adjusted in a short time.

The storage status adjusting circuit 110 of the present embodiment includes switching elements SL1, SL2, S11, S12, S21, S22, S31, S32, S41, and S42, and current limiting circuits 150 and 160. Each of the switching elements in the storage status adjusting circuit 110 of the present embodiment is, for example, a MOSFET (Metal-Oxide-Semiconductor Field-Effect Transistor), or the like.

The assembled battery 120 includes a secondary battery B1, a secondary battery B2, a secondary battery B3, and a secondary battery B4. The secondary batteries B1-B4 are storage means capable of charge and discharge, and are connected in series between the B+ terminal and the B− terminal.

Although the present embodiment is directed to a configuration in which the assembled battery 120 has the four secondary batteries B1-B4, this is not a limiting example.

The secondary batteries may be configured with such as electric double-layer capacitors, or the like.

In the present embodiment, the secondary batteries B1-B4 are divided into two groups. Specifically, a first group comprises the secondary battery B1 and the secondary battery B2, while a second group comprises the secondary battery B3 and the secondary battery B4.

Additionally, although the present embodiment is directed to a configuration in which a group comprises two secondary batteries, this is not a limiting example. The number of secondary batteries included in a group may be any number that is two or more. Further, although the secondary batteries in the disclosed example are divided into two groups, the number of the groups is not limited to two. When there are six secondary batteries, for example, the number of the groups may be three. Thus the number of the groups may be any number according to the number of secondary batteries.

The switching elements SL1, S11, S12, S21, and S22 and the current limiting circuit 150 in the storage status adjusting circuit 110 of the present embodiment form a first adjusting unit that adjusts a storage status of the secondary batteries B1 and B2 in the first group. In other words, the first adjusting unit is a first switching unit that switches between energy accumulation in the coil L1 and energy release from the coil L1 to any one of the secondary batteries in the first group having a plurality of the secondary batteries.

Also, the switching elements SL2, S31, S32, S41, and S42 and the current limiting circuit 160 in the storage status adjusting circuit 110 of the present embodiment form a second adjusting unit that adjusts the storage status of the secondary batteries B3 and B4 in the second group. In other words, the second adjusting unit is a second switching unit that switches between energy accumulation in the coil L2 and energy release from the coil L2 to any one of the secondary batteries in the second group having a plurality of the secondary batteries.

The cell voltage detecting circuit 130 in the present embodiment detects respective cell voltages in the secondary batteries B1-B4, and outputs the detected cell voltages to the controller 140.

The controller 140 of the present embodiment controls the switching elements SL1, S11, S12, S21, and S22 and the current limiting circuit 150, and makes the first adjusting unit adjust the storage status of the secondary batteries B1 and B2. Further, the controller 140 of the present embodiment controls the switching elements SL2, S31, S32, S41, and S42 and the current limiting circuit 160, and makes the second adjusting unit adjust the storage status of the secondary batteries B3 and B4. A detailed description of the controller 140 will be given later.

Herein below, connections between parts in the storage status adjusting circuit 110 of the present embodiment will be described.

The secondary batteries B1-B4 of the present embodiment are connected in series. A positive electrode of the secondary battery B1 is connected with the B+ terminal, and a negative electrode of the secondary battery B4 is connected with the B− terminal.

Further, the positive electrode of the secondary battery B1 is connected with one end of the switching element SL1 and one end of the switching element SL2.

The other end of switching element SL1 is connected with one end of the coil L1. In FIG. 1, a connecting point between the coil L1 and the switching element SL1 is shown as a connecting point La1. The other end of the coil L1 is connected with one end of the current limiting circuit 150. In FIG. 1, a connecting point between the other end of the coil L1 and one end of the current limiting circuit 150 is shown as a connecting point Lb1. The other end of current limiting circuit 150 is connected with the B− terminal and the negative electrode of the secondary battery B4.

The other end of the switching element SL2 is connected with one end of the coil L2. In FIG. 1, a connecting point between the coil L2 and the switching element SL2 is shown as a connecting point La2. The other end of the coil L2 is connected with one end of the current limiting circuit 160. In FIG. 1, a connecting point between the other end of the coil L2 and one end of the current limiting circuit 160 is shown as a connecting point Lb2. The other end of current limiting circuit 160 is connected with the B− terminal and the negative electrode of the secondary battery B4. A detailed description of the current limiting circuits 150 and 160 will be given later.

In the present embodiment, one end of the switching element S11 is connected with the positive electrode of the secondary battery B1. In the same way, one end of the switching element S21 is connected with the positive electrode of the secondary battery B2, one end of the switching element S31 is connected with the positive electrode of the secondary battery B3, and one end of the switching element S41 is connected with the positive electrode of the secondary battery B4. The other end of the switching element S11 and the other end of the switching element S21 are connected with the connecting point Lb1. The other end of the switching element S31 and the other end of the switching element S41 are connected with the connecting point Lb2.

In the present embodiment, one end of the switching element S12 is connected with the negative electrode of the secondary battery B1. In the same way, one end of the switching element S22 is connected with the negative electrode of the secondary battery B2, one end of the switching element S32 is connected with the negative electrode of the secondary battery B3, and one end of the switching element S42 is connected with the negative electrode of the secondary battery B4. The other end of the switching element S12 and the other end of the switching element S22 are connected with the connecting point La1. The other end of the switching element S32 and the other end of the switching element S42 are connected with the connecting point La2.

Thus, the switching elements S11 and S12 are disposed corresponding to the secondary battery B1, and form a switching unit that controls connection (continuity)/disconnection between the secondary battery B1 and the coil L1. The switching elements S21 and S22 are disposed corresponding to the secondary battery B2, and form a switching unit that controls connection/disconnection between the secondary battery B2 and the coil L1. The switching elements S31 and S32 are disposed corresponding to the secondary battery B3, and form a switching unit that controls connection/disconnection between the secondary battery B3 and the coil L2. The switching elements S41 and S42 are disposed corresponding to the secondary battery B4, and form a switching unit that controls connection/disconnection between the secondary battery B4 and the coil L2.

The cell voltage detecting circuit 130 and the controller 140 are connected between the B+ terminal and the B− terminal.

In the following, each part in the controller 140 of the present embodiment will be described.

The controller 140 of the present embodiment includes a control unit 200, a control unit 300, and a reference voltage control unit 400.

The control unit 200 controls the switching elements included in the first adjusting unit. The control unit 300 controls the switching elements included in the second adjusting unit. A detailed description of the control units 200 and 300 will be given later.

The reference voltage control unit 400 controls the values, which will be described below, respectively obtained by the current limiting circuits 150 and 160, based on a storage status of the first group and a storage status of the second group. A detailed description of a process of the reference voltage control unit 400 will be given later.

In the following, the control unit 200 will be described. The control unit 200 includes a logic circuit 210, a logic circuit 220, a clock generating unit 230 and a lowest voltage detecting unit 240.

The logic circuits 210 and 220 control on-off of the switching elements in the first adjusting unit so as to control supply and shut-off of coil current IL1 of the coil L1. Also, the logic circuits 210 and 220 control on-off of the switching elements in the first adjusting unit so as to release electricity accumulated in the coil L1 to the secondary battery detected by the lowest voltage detecting unit 240.

Specifically, the logic circuit 210 generates a signal SGa' (see FIG. 2) that is a base of a control signal SGa for controlling the switching element SL1 and a switching element SCL1 included in the current limiting circuit 150, a control signal SG11 for controlling the switching element S11, and a control signal SG12 for controlling the switching element S12. The logic circuit 220 generates the signal SGa', a control signal for controlling the switching element S21, and a control signal for controlling the switching element S22.

The control unit 200 of the present embodiment has an OR circuit (not shown) whose input signal is the signal SGa' respectively generated by the logic circuits 210 and 220, and an output signal of the OR circuit is the control signal SGa.

The clock generating unit 230 generates a clock signal CLK1 to be provided to the logic circuits 210 and 220. The clock generating unit 230 provides the clock signal CLK1 of a certain frequency to only a logic circuit that corresponds to the secondary battery detected by the lowest voltage detecting unit 240, and the level of the clock signal CLK1 may be fixed when the clock signal CLK1 is provided to another logic circuit.

The lowest voltage detecting unit 240 detects a secondary battery having the lowest cell voltage in the first group of the secondary batteries, based on the output from the cell voltage detecting circuit 130, and informs the logic circuits 210 and 220 of the detection result. Specifically, the lowest voltage detecting unit 240 has provided the logic circuits 210 and 220 with a select notification signal with a low level (hereinafter referred to as L level), in advance. When the lowest voltage detecting unit 240 detects the secondary battery having the lowest cell voltage in the secondary batteries of the first group, the lowest voltage detecting unit 240 may invert a level of the select notification signal, which is provided with the logic circuit corresponding to the secondary battery, to a high level (hereinafter referred to as H level).

In the following, the control unit 300 will be described. The control unit 300 includes a logic circuit 310, a logic circuit 320, a clock generating unit 330 and a lowest voltage detecting unit 340.

Each part in the control unit 300 of the present embodiment has a similar function to that of respective part in the control unit 200.

For example, logic circuits 310 and 320 control on-off of switching elements in the second adjusting unit so as to control supply and shut-off of a coil current IL2 of the coil L2. Also, the logic circuits 310 and 320 control on-off of switching elements in the second adjusting unit so as to release electricity accumulated in the coil L2 to the secondary battery detected by the lowest voltage detecting unit 340.

Specifically, the logic circuit 310 generates a signal SGb' (not shown) that is a base of a control signal SGb for controlling on-off of the switching element SL2, a control signal for controlling the switching element 31, and a control signal for controlling the switching element 32. The logic circuit 320 generates a signal SGb', a control signal for controlling the switching element 41, and a control signal for controlling the switching element 42.

The control unit 300 of the present embodiment has an OR circuit (not shown) whose input signal is the signal SGb' respectively generated by the logic circuits 310 and 320, and an output signal of the OR circuit is the control signal SGb.

The clock generating unit 330 generates a clock signal CLK2 to be provided to the logic circuits 310 and 320.

The lowest voltage detecting unit 340 detects a secondary battery having the lowest cell voltage in the second group of the secondary batteries, based on the output from the cell voltage detecting circuit 130, and informs the logic circuits 310 and 320 of the detection result.

Additionally, the clock generating units 230 and 330 may be configured as one block. Also, the lowest voltage detecting units 240 and 340 may be configured as one block.

Further, in FIG. 1, only connection between the logic circuit 210 and the switching element SL1, connection between the logic circuit 210 and the current limiting circuit 150, connections between the logic circuit 210 and the switching elements S11 and S12, connection between the logic circuit 310 and the switching element SL2, connection between the logic circuit 310 and the current limiting circuit 160, and connections between the logic circuit 310 and the switching elements S31 and S32 are shown. In the storage battery pack 100 of the present embodiment, connection between the logic circuit 220 and the switching element SL1, and connections between the logic circuit 220 and the switching elements S21 and S22 are the same as connection between the logic circuit 210 and the switching element SL1, and connections between the logic circuit 210 and switching elements S11 and S12. Also, the connection between the logic circuit 320 and the switching element SL2, and connections between the logic circuit 320 and the switching elements S41 and S42 are the same as connection between the logic circuit 310 and the switching element SL2, and connections between the logic circuit 310 and the switching elements S31 and S32. A detailed description of the logic circuits 210, 220, 310, and 320 will be given later.

As described above, in the present embodiment, the controller 140 detects a secondary battery having the lowest cell voltage in the group of secondary batteries, and connects the detected secondary battery with a coil.

In the storage status adjusting circuit 110 of the present embodiment, through such operation, electricity is supplied to a secondary battery having the lowest cell voltage in the group; then, storage status of secondary batteries in the group is adjusted. Further, in the present embodiment, since the secondary batteries in the assembled battery 120 are divided into a plurality of groups and each one of the coils is dedicated to a respective one of the groups, it is possible to immediately adjust storage status, for example, even if the assembled battery 120 has a number of the secondary batteries.

In the following, current limiting circuits 150 and 160, and logic circuits 210, 220, 310, and 320 are described with reference to FIG. 2.

Figure 2:
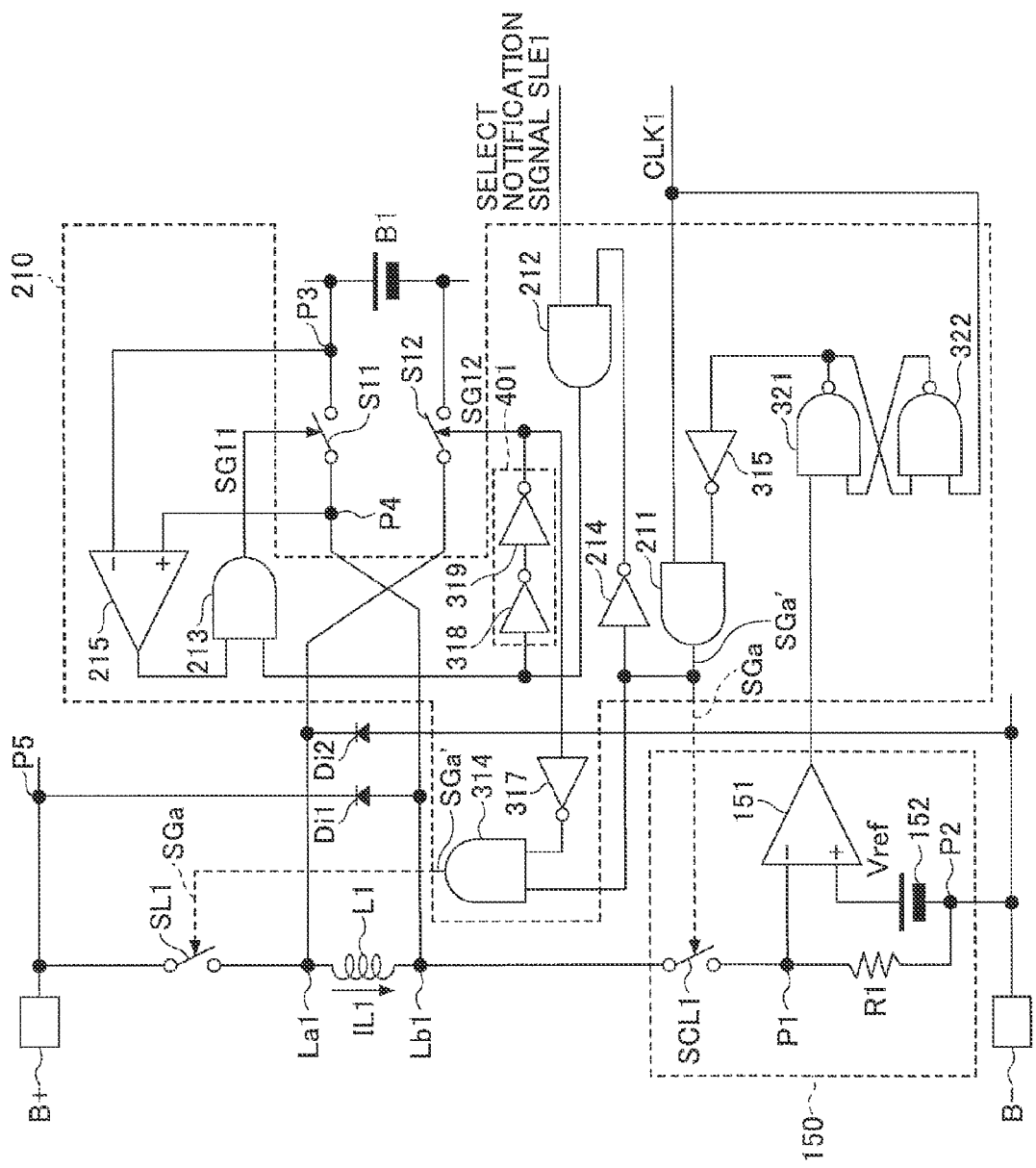
FIG. 2 is an illustrative drawing for illustrating an example of a current limiting circuit and a logic circuit.

FIG. 2 is an illustrative drawing for illustrating an example of a current limiting circuit and a logic circuit. The logic circuits 210, 220, 310, and 320 of the present embodiment respectively have identical configurations. Also, the current limiting circuits 150 and 160 of the present embodiment respectively have identical configurations. Therefore, in FIG. 2, the logic circuit 210 and the current limiting circuit 150 are shown as an example. Additionally, the logic circuit 210 in FIG. 2 is an example of a circuit for performing an operation shown in a timing diagram in FIG. 3. The logic circuit 210 may only have a configuration for performing the operation shown the timing diagram in FIG. 3.

The current limiting circuit 150 of the present embodiment includes the switching element SCL1, a resistor R1, a comparator 151, and a reference voltage generating unit 152.

One end of the switching element SCL1 is connected with the connecting point Lb1 and the other end of the switching element SCL1 is connected with the connecting point P1 at which an inverting input terminal of the comparator 151 and one end of the resistor R1 are connected. The switching elements SL1 and SCL1 of the present embodiment are controlled to be switched on-off by the control signals SGa, respectively output from the logic circuit 210. That is, the switching elements SL1 and SCL1 of the present embodiment form a switching unit that controls connection/disconnection in series between the secondary batteries B1-B4 and the coil L1. In other words, the switching elements SL1 and SCL1 of the present embodiment form a switching unit that controls accumulation and release of electricity of the coil L1. The other end of the resistor R1 is connected with a connecting point P2 at which a negative electrode of the reference voltage generating unit 152 and the B– terminal are connected.

The reference voltage generating unit 152 generates a reference voltage Vref, and a positive electrode thereof is connected with the non-inverting input terminal of the comparator 151. An output signal of the comparator 151 is provided at one input terminal of a NAND circuit 321 described below.

The logic circuit 210 of the present embodiment includes AND circuits 211, 212, 213 and 314, NOT circuits 315, 214, 317, 318 and 319, a comparator 215, and NAND circuits 321 and 322.

The clock signal CLK1 output from the clock generating unit 230 is provided at one input terminal of the AND circuit 211 and an output signal of the NOT circuit 315 is provided at the other input terminal of the AND circuit 211. An output signal of the AND circuit 211 is provided to the NOT circuit 214. Also, the output signal of the AND circuit 211 is provided at one input terminal of the AND circuit 314.

Further, the output signal of the AND circuit 211 is provided, as the signal SGa', to the OR circuit (not shown) in the controller 140. An output signal of the OR circuit is provided, as the control signal SGa, to the switching element SCL1.

An output signal of the NOT circuit 214 is provided at one input terminal of the AND circuit 212. The select notification signal SLE1, output from the lowest voltage detecting unit 240, is provided at the other input terminal of the AND circuit 212.

An output signal of the AND circuit 212 is provided at an input terminal of the NOT circuit 318. An output signal of the NOT circuit 318 is provided at an input terminal of the NOT circuit 319. An output signal of the NOT circuit 319, as a control signal SG12 for controlling on-off of the switching element S12, is provided to the switching element S12. Also, the output signal of the NOT circuit 319 is provided at an input terminal of the NOT circuit 317. Additionally, in the present embodiment, the NOT circuit 318 and the NOT circuit 319 form a delay circuit 401.

The output signal of the AND circuit 212 is also provided at one input terminal of the AND circuit 213. An output signal of the comparator 215 is provided at the other input terminal of the AND circuit 213.

An output signal of the AND circuit 213 is provided, as a control signal SG11 for controlling on-off of the switching element S11, to the switching element S11.

An inverting input terminal of the comparator 215 is connected with one end of the switching element S11 being connected with the secondary battery B1. A connecting point between the inverting input terminal of the comparator 215 and one end of the switching element S11 is shown as a connecting point P3.

A non-inverting input terminal of the comparator 215 is connected with the other end of the switching element S11 being connected with the coil L1. A connecting point between the non-inverting terminal of the comparator 215 and the other end of the switching element S11 is shown as a connecting point P4.

In the present embodiment, the signal SGa', which is an output signal of the AND circuit 211, is provided at one input terminal of the AND circuit 314. An output signal of the NOT circuit 317 is provided at the other input terminal of the AND circuit 314. An output signal of the AND circuit 314 is provided, as the signal SGa', to the OR circuit (not shown) in the controller 140. An output signal of the OR circuit is provided, as the control signal SGa, to the switching element SL1.

In the present embodiment, the NAND circuit 321 and the NAND circuit 322 form a flip-flop. An output signal of the comparator 151 is provided at one input terminal of the NAND circuit 321 while an output signal of the NAND circuit 322 is provided at the other input terminal of the NAND circuit 321. The clock signal CLK1 output from the clock generating unit 230 is provided at one input terminal of the NAND circuit 322 while an output signal of the NAND circuit 321 is provided at the other input terminal of the NAND circuit 322. The output signal of the NAND circuit 321 is provided at an input terminal of the NOT circuit 315.

Also, in the present embodiment, one end of the switching element S11 is connected with an anode electrode of a diode Di1. A cathode electrode of the diode Di1 is connected with the positive electrode of the secondary battery B1 and the B+ terminal. A connecting point between the cathode electrode of the diode Di1 and the B+ terminal is shown as a connecting point P5. Further, one end of the switching element S12 is connected with a cathode electrode of a diode Di2. The anode electrode of the diode Di2 is connected with the negative electrode of the secondary battery B4 and the B– terminal.

Figure 3:
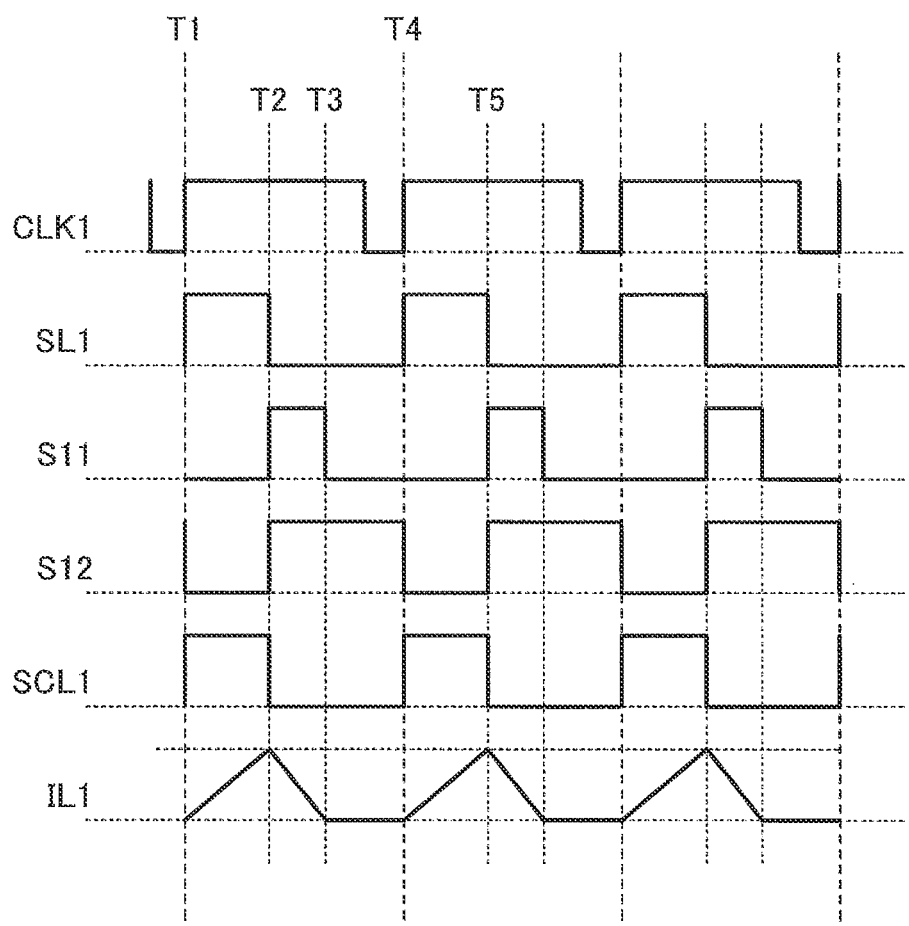
FIG. 3 is a timing diagram for illustrating an operation of a storage status adjusting circuit.

Herein below, an operation of the storage status adjusting circuit 110 of the present embodiment will be described with reference to FIG. 3. FIG. 3 is a timing diagram for illustrating an operation of a storage status adjusting circuit. In FIG. 3, an operation of the first adjusting unit, in a case where the secondary battery B1 has been detected by the lowest voltage detecting unit 240, and a H level select notification signal SLE1 has been provided to the logic circuit 210, is shown.

First, an operation of the first adjusting unit at timing T1 will be described. At timing T1, a H level clock signal CLK1 is provided. Signal level of an output signal of the comparator 215 is H level, since a voltage between connecting points P1 and P2 does not reach the reference voltage, at timing T1. Therefore, signal level of an output signal of the AND circuit 211 becomes H level. That is, at timing T1, signal level of the control signal SGa becomes H level, then switching elements SL1 and SCL1 are switched on to start to supply coil current IL1 to the coil L1.

Also, through the NOT circuit 214, the output signal of the AND circuit 211 is inverted to L level to be provided at one input terminal of the AND circuit 212. Signal level of an output signal of the AND circuit 212 is L level, since a H level select notification signal SLE1 is provided at the other input terminal of the AND circuit 212. That is, at timing T1, signal level of the control signal SG12 becomes L level, then the switching element S12 is switched off.

An L level output signal of the AND circuit 212 is provided at one input terminal of the AND circuit 213. Therefore, signal level of an output signal of the AND circuit 213 is L level regardless of signal level of an output signal of the comparator 215. That is, at timing T1, signal level of the control signal SG11 becomes L level, then the switching element S11 is switched off.

As described above, in the first adjusting unit of the present embodiment, at timing T1, the switching elements SL1 and SCL1 are switched on, while the switching elements S11 and S12 are switched off.

Thus, in the present embodiment, at timing t1, the coil L1 is connected in series with the secondary batteries B1 and B2 when, for example, the storage battery pack 100 is not connected with a battery charger. In this case, the coil current IL1 is supplied from the secondary batteries B1 and B2 to the coil L1.

Meanwhile, through the B+ terminal and the B− terminal, both ends of the coil L1 are connected with a battery charger when, for example, the storage battery pack 100 is connected with the battery charger. In this case, the coil current IL1 is supplied from the battery charger to the coil L1.

In the following, an operation of the first adjusting unit at timing T2 will be described. At timing T2, the coil current IL1 is supplied to the coil L1, wherein the voltage between the connecting points P1 and P2 reaches the reference voltage. At timing T2, an output signal of the comparator 151 is inverted from H level to L level. Therefore, at timing T2, an output signal of the AND circuit 211 is inverted to L level regardless of signal level of the clock signal CLK1.

That is, at timing T2, signal level of control signal SGa becomes L level, then switching elements SL1 and SCL are switched off to stop to supply coil current IL1 to the coil L1.

Also, through the NOT circuit 214, the output signal of the AND circuit 211 is inverted to H level to be provided at one input terminal of the AND circuit 212. Signal level of an output signal of the AND circuit 212 becomes H level, since a H level select notification signal SLE1 is provided at the other input terminal of the AND circuit 212. That is, at timing T2, signal level of the control signal SG12 becomes H level, then the switching element S12 is switched on.

A H level output signal of the AND circuit 212 is provided at one input terminal of the AND circuit 213. In this case, an electrical potential at the connecting point P4 is higher than an electrical potential at the connecting point P3, since electricity is accumulated in the coil L1. Therefore, signal level of an output signal of the comparator 215 becomes H level.

Thus, an output signal of the AND circuit 213 is inverted from L level to H level. That is, at timing T2, signal level of a control signal SG11 becomes H level, and the switching element S11 is switched off.

As described above, in the first adjusting unit of the present embodiment, at timing T2, the switching elements SL1 and SCL1 are switched off, while the switching elements S11 and S12 are switched on. Through this operation, in the storage status adjusting circuit 110 of the present embodiment, the secondary battery B1, which has been detected by the lowest voltage detecting unit 240, is connected with the coil L1 to release and supply electricity accumulated in the coil L1 to the secondary battery B1.

In the following, an operation of the first adjusting unit at timing T3 will be described. At timing T3, release of electricity from the coil L1 to the secondary battery B1 is finished. In the present embodiment, timing at which release of electricity from the coil L1 is finished is detected based on a potential difference between the connecting point P3 and the connecting point P4. More specifically, in the present embodiment, an electrical potential at connecting point P3 is compared with an electrical potential at connecting point P4 by the comparator 215. Then, the first adjusting unit switches off the switching element S11 by an output signal of the comparator 215, when the electrical potential at connecting point P3 becomes higher than the electrical potential at connecting point P4, to disconnect the coil L1 from the secondary battery B1.

At timing T3, when the electrical potential at connecting point P3 becomes higher than the electrical potential at connecting point P4 through release of electricity from the coil L1 to the secondary battery B1, an output signal of the comparator 215 is inverted from H level to L level. Therefore, an output signal of the AND circuit 213 is inverted from H level to L level. That is, at timing T3, signal level of the control signal SG11 becomes L level, and the switching element S11 is switched off to disconnect the coil L1 from the secondary battery B1.

As described above, in the first adjusting unit of the present embodiment, in a term between timing T2 and timing T3, electricity accumulated in the coil L1 is supplied to the secondary battery B1 to charge the secondary battery B1.

Additionally, in the present embodiment, at timing T3, the switching elements SL1 and SCL1 remain to be switched off while the switching element S12 remains to be switched on. In the present embodiment, timing at which the control signal SGa is inverted to H level (timing at which the switching elements SL1 and SCL1 are switched on) is determined based on the clock signal CLK1.

Further, in the present embodiment, the control signal SGa is a signal in reverse phase to the control signal SG12. Therefore, the control signal SG12 is inverted from H level to L level in synchronization with timing at which the control signal SGa is inverted from L level to H level. That is, the switching element S12 is switched off in synchronization with timing at which the switching elements SL1 and SCL1 are switched on.

At timing T4, when signal level of the clock signal CLK1 becomes H level, similarly to the case of timing T1, the switching elements SL1 and SCL1 are switched on while the switching element S12 is switched off. Additionally, at this timing, from timing T3, the switching element S11 remains to be switched off.

That is, at timing T4, the first adjusting unit of the present embodiment is operated similarly to that at timing T1, coil current IL1 starts to be supplied to coil L1.

The lowest voltage detecting unit 240 of the present embodiment may detect a secondary battery having the lowest cell voltage during a term between timing T3 and timing T4 at which the clock signal CLK1 next rises. Also, the lowest voltage detecting unit 240 may detect a secondary battery having the lowest cell voltage during a term between timing T3 and timing T5 at which supply of coil current IL1 to coil L1 is stopped. The lowest voltage detecting unit 240 of the present embodiment, for example, may detect a secondary battery having the lowest cell voltage in every certain interval.

Further, in FIG. 3, operation of the switching elements SL1 and SCL1 and the switching elements S11 and S12 that are controlled by the logic circuit 210 in the first adjusting unit is illustrated, and illustration of operation of switching elements that are controlled by the logic circuit 220 is omitted.

In an example of FIG. 3, the logic circuit 220 has controlled switching elements S21 and S22 to be switched off.

The logic circuit 220 of the present embodiment, for example, if the lowest voltage detecting unit 240 detects the secondary battery B2 after timing T3 shown in FIG. 3, performs a similar operation to an operation of the logic circuit 210 as described above. That is, the logic circuit 220 controls on-off of the switching elements SL1 and SCL1 and the switching elements S21 and S22 to supply electricity accumulated in the coil L1 to the secondary battery B2. Also, the logic circuit 210 has controlled switching elements S11 and S12 to be switched off.

Herein below, in the first adjusting unit, an operation of the logic circuit 210, in a case where the secondary battery B2 is detected by the lowest voltage detecting unit 240, will be described.

The lowest voltage detecting unit 240 of the present embodiment provides H level select notification signal SEL1 with a logic circuit which corresponds to the detected secondary battery, and provides L level select notification signal SEL1 with a logic circuit other than the logic circuit which corresponds to the detected secondary battery.

Further, the clock generating unit 230 of the present embodiment provides the clock signal CLK being fixed at a signal level thereof to L level with a logic circuit other than the logic circuit which corresponds to the secondary battery detected by the lowest voltage detecting unit 240.

Therefore, in a case where the lowest voltage detecting unit 240 does not detect the secondary battery B1, the clock signal CLK, which is provided at one input terminal of the AND circuit 211, is fixed to L level, and an output signal of the AND circuit 211 is also fixed to L level. Thus, the control signal SGa is also fixed to L level.

Further, in the logic circuit 212, the select notification signal, which is provided at one input terminal of the AND circuit 212, is fixed to L level, and an output signal of the AND circuit 212 is also fixed to L level. Thus, an output signal of the AND circuit 213 is fixed to L level, the control signals SG11 and SG12 become L level, and switching elements S11 and S12 are switched off.

As described above, in the storage status adjusting circuit 110 of the present embodiment, switching elements SL1 and SCL1 are switched on in synchronization with a rising edge of the clock signal CLK1, and the coil L1 is connected between the B+ terminal and the B− terminal to accumulate electricity in the coil L1, by the first adjusting unit. Also, in the storage status adjusting circuit 110 of the present embodiment, switching elements S11, S12, S21, and S22 are operated so as to connect the coil L1 with a secondary battery having the lowest cell voltage when electricity accumulated in the coil L1 reaches a certain value, by the first adjusting unit.

That is, the first adjusting unit of the present embodiment forms a closed loop by connecting the coil L1 with a secondary battery having the lowest cell voltage in a first group, which is detected in every certain interval, then, in this closed loop, electricity accumulated in the coil L1 is supplied to a secondary battery to charge the secondary battery.

In the present embodiment, the second adjusting unit also adjusts storage status of the secondary battery B3 and the secondary battery B4, through a similar operation to that of the first adjusting unit.

In the following, an operation of the reference voltage control unit 400 of the present embodiment will be described. The reference voltage control unit 400 compares a cell voltage detected by the lowest voltage detecting unit 240 in the first adjusting unit and a cell voltage detected by the lowest voltage detecting unit 340 in the second adjusting unit. Then, the reference voltage control unit 400 of the present embodiment adjusts a reference voltage of the current limiting circuit 150 in the first adjusting unit and a reference voltage of the current limiting circuit 160 in the second adjusting unit, when the difference between two cell voltages becomes equal to or greater than a certain threshold.

Figure 4:
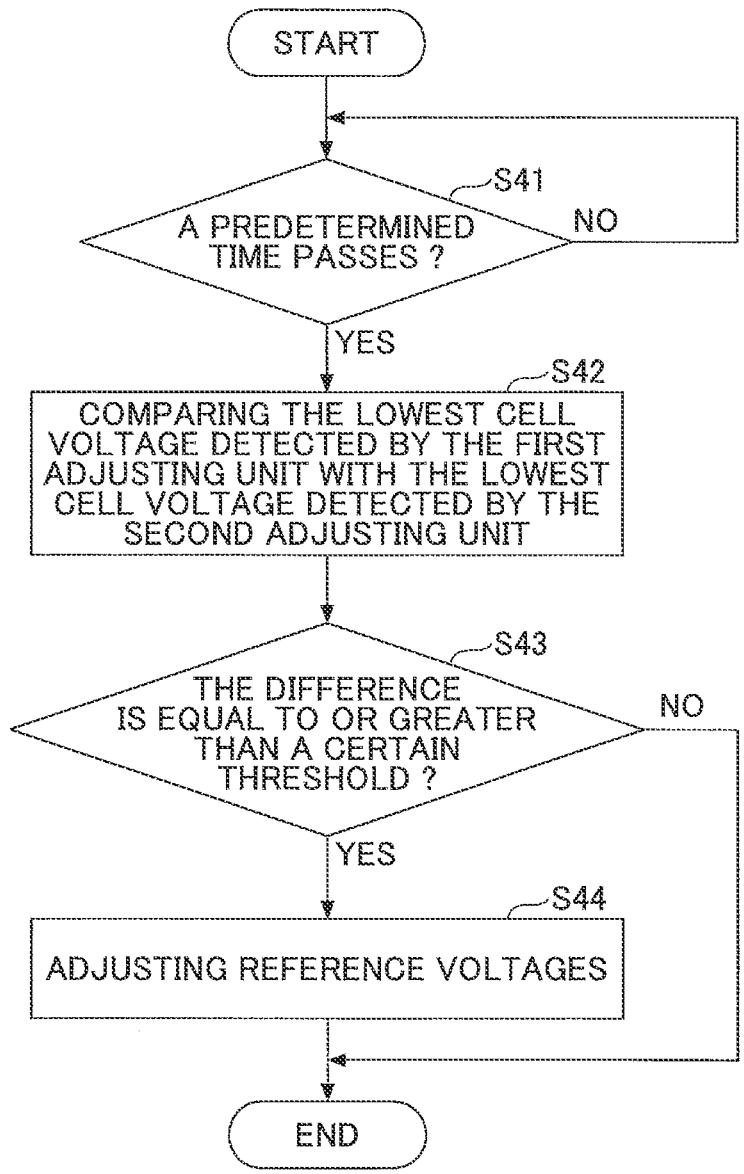
FIG. 4 is a flowchart for illustrating the process performed by a reference voltage control unit.

Herein below, a process performed by the reference voltage control unit 400 will be described. FIG. 4 is a flowchart illustrating the process performed by the reference voltage control unit 400.

The reference voltage control unit 400 of the present embodiment determines whether or not a predetermined time passes (step S41). If the predetermined time does not pass, in step S41, the reference voltage control unit 400 waits until the predetermined time passes.

If a predetermined time passes, in step S 41, the reference voltage control unit 400 compares a first cell voltage which has been detected by the lowest voltage detecting unit 240 with a second cell voltage which has been detected by the lowest voltage detecting unit 340 (step S42). Additionally, although in step S42, it is shown that the lowest voltages respectively detected by the lowest voltage detecting units 240 and 340 are compared with each other, this is not a limiting example. The reference voltage control unit 400 of the present embodiment, for example, may respectively calculate an average of cell voltages of the secondary batteries B1 and B2, and an average of cell voltages of the secondary batteries B3 and B4, and may compare the two averages.

Then, the reference voltage control unit 400 determines whether a difference between the first cell voltage and the second cell voltage is equal to or greater than a certain threshold (step S43).

In step S43, in a case where the difference between the first cell voltage and the second cell voltage is less than a certain threshold, the reference voltage control unit 400 ends the process. In step S43, in a case where the difference between the first cell voltage and the second cell voltage is equal to or greater than a certain threshold, the reference voltage control unit 400 adjusts reference voltages of the current limiting circuits 150 and 160 (step S44).

That is, in the present embodiment, in a case where the difference between a potential difference corresponding to the first cell voltage and a potential difference corresponding to the second cell voltage is equal to or greater than a certain threshold, a potential difference between both ends of the coil L1 and a potential difference between both ends of the coil L2 are respectively changed.

Herein below, adjustment of the reference voltage of the present embodiment will be described. For example, the reference voltage control unit 400 may output the voltage adjustment signal VCL for raising a value of the reference voltage to the reference voltage generating unit 152 of the current limiting circuit 150 in the first adjusting unit, in a case where the first cell voltage is lower, by a certain threshold or more, than the second cell voltage. In this case, voltage adjustment signal VCL is preferably to make the reference voltage in the current limiting circuit 150 be higher than the reference voltage in the current limiting circuit 160.

In the first adjusting unit, when the reference voltage of the current limiting circuit 150 becomes higher than the reference voltage of the current limiting circuit 160, coil current IL1 becomes larger than coil current IL2. Therefore, the first adjusting unit can perform averaging of the cell voltages of the secondary battery B1 and the secondary battery B2 faster than the second adjusting unit, and a difference between the first voltage and the second voltage can be reduced.

Also, the reference voltage control unit 400 of the present embodiment, for example, may respectively output the voltage adjustment signal VCL to current limiting circuits 150 and 160 so that the reference voltage of the current limiting circuit 150 becomes higher and the reference voltage of the current limiting circuit 160 becomes lower. In this case, coil current IL1 also becomes larger than coil current IL2; then, the first adjusting unit can perform averaging of the cell voltages of the secondary battery B1 and the secondary battery B2 faster than the second adjusting unit.

Further, the reference voltage control unit 400 of the present embodiment adjusts the reference voltage of the current limiting circuit 160 to be higher than the reference voltage of the current limiting circuit 150, in a case where the second cell voltage is lower, by a certain threshold or more, than the first cell voltage. Therefore, coil current IL2 becomes larger than coil current IL1; then, the second adjusting unit can perform averaging of the cell voltages of the secondary battery B3 and secondary battery B4 faster than the first adjusting unit.

Additionally, although the present embodiment is directed to a configuration in which, among cell voltages of secondary batteries in both groups, the lowest cell voltages of both groups are compared with each other, this is not a limiting example.

For example, in the present embodiment, values of coil current IL1 and IL2 may be adjusted based on a comparison result of a whole voltage of the secondary batteries B1 and B2 included in the first group with a whole voltage of the secondary batteries B3 and B4 included in the second group.

Specifically, for example, after comparing a potential difference between a positive electrode of the secondary battery B1 and a negative electrode of the secondary battery B2 included in the first group with a potential difference between a positive electrode of the secondary battery B3 (negative electrode of the secondary battery B2) and a negative electrode of the secondary battery B4 included in the second group, values of coil current IL1 and IL2 may be adjusted based on such comparison result.

Through the operation described above, the storage status adjusting circuit 110 of the present embodiment can charge only a secondary battery having lowest cell voltage among a plurality of the secondary batteries to adjust storage status. Also, the storage status adjusting circuit 110 of the present embodiment can perform averaging of storage status of a plurality of the secondary batteries since the secondary batteries are divided into a plurality of groups and storage status is adjusted in each group. Further, the storage status adjusting circuit 110 of the present embodiment can adjust storage status between groups of secondary batteries.

Further, the storage status adjusting circuit 110 of the present embodiment can adjust storage status of a plurality of the secondary batteries by using one coil. As described above, the present embodiment can greatly contribute to downsizing compared to a transformer-type, and this advantageous effect becomes more remarkable, especially, in a case where larger current has to be controlled. Also, it is known that energy-loss is caused by a transformer not only with load but also without load; then, the present embodiment can eliminate energy-loss caused by transformers.

(Second Embodiment)

Herein below, a second embodiment will be described with reference to the drawings. In the second embodiment, a diode is used to prevent energy back flow from secondary batteries B1-B4 to coils L1 and L2, which is different from the case of the first embodiment. Therefore, in the description of the second embodiment below, only the difference between the second embodiment and the first embodiment will be described; an identical reference numeral will be applied to elements or the like that have similar functions and configurations to those of in the first embodiment, and descriptions thereof will be omitted.

Figure 5:
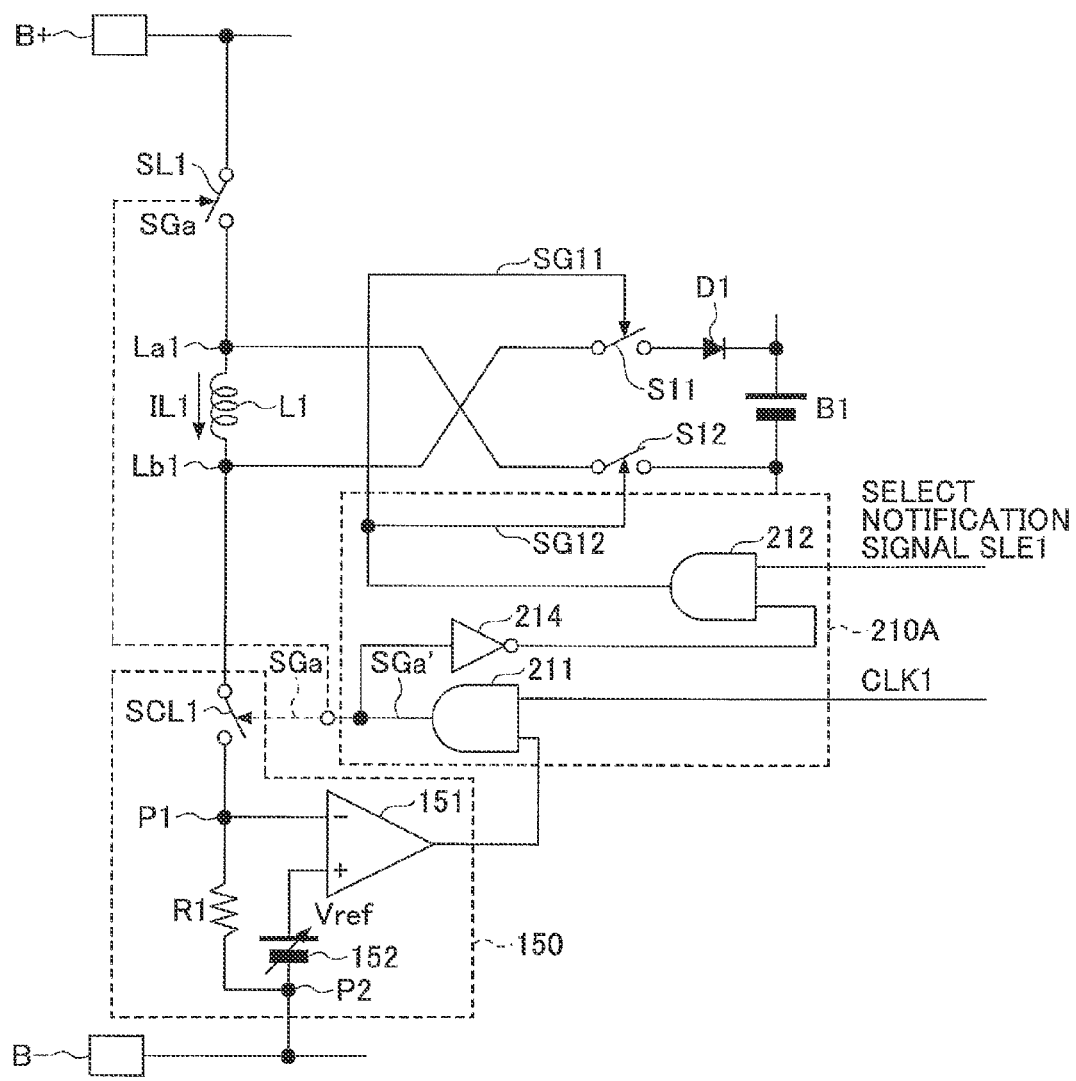
FIG. 5 is an illustrative drawing for illustrating another example of the current limiting circuit and the logic circuit.

FIG. 5 is an illustrative drawing for illustrating another example of a current limiting circuit and a logic circuit.

Additionally, in the present embodiment, logic circuits included in the controller 140 have similar functions; therefore, in FIG. 5, a logic circuit 210A is illustrated as an example of four logic circuits.

In the present embodiment, a diode D1 is disposed between one end of a switching element S11 and a positive electrode of a secondary battery B1. Additionally, in the storage status adjusting circuit of the present embodiment, a diode is respectively disposed, similarly to a configuration shown in FIG. 5, between one end of a switching element S21 and a positive electrode of a secondary battery B2, between one end of a switching element S31 and a positive electrode of a secondary battery B3, and between one end of a switching element S41 and a positive electrode of a secondary battery B4.

The logic circuit 210A of the present embodiment includes AND circuits 211 and 212, and a NOT circuit 214. In the present embodiment, an output signal of the AND circuit 212 is respectively provided, as control signals SG11 and SG12, with the switching element S11 and a switching element S12.

Therefore, in the present embodiment, a control signal SG11 and a control signal SG12 are signals in reverse phase to the control signal SGa.

Figure 6:
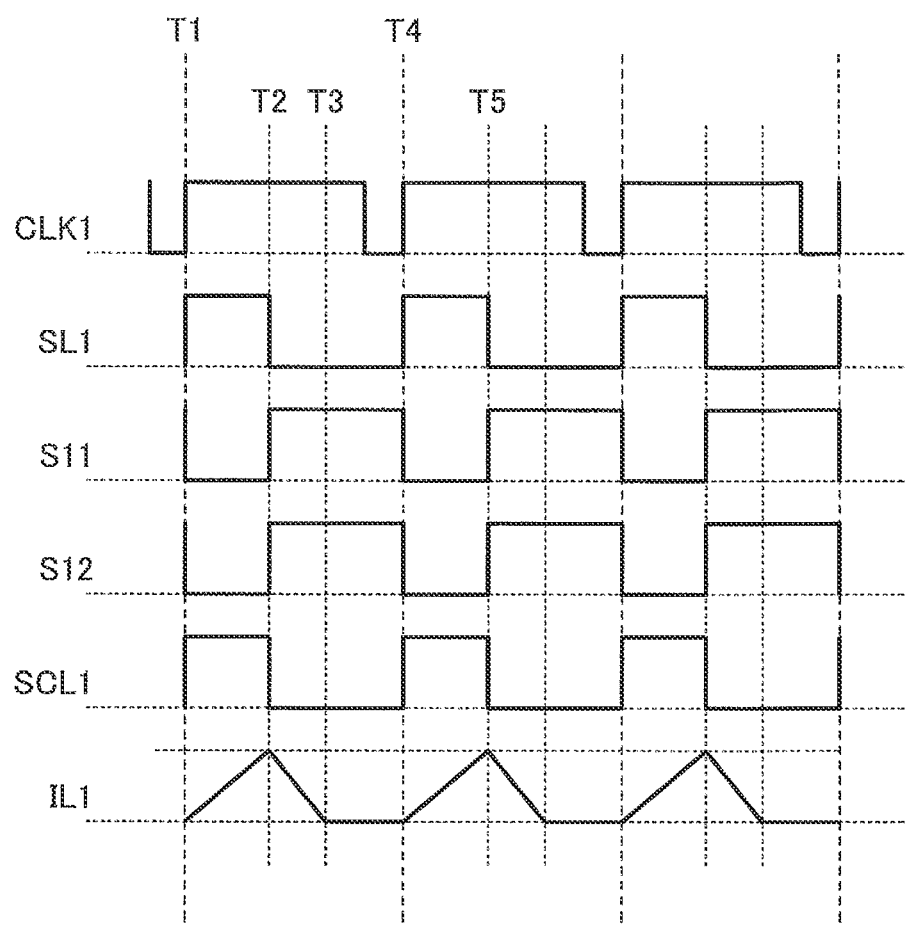
FIG. 6 is another timing diagram for illustrating an operation of the storage status adjusting circuit.

FIG. 6 is another timing diagram for illustrating an operation of a storage status adjusting circuit. In the present embodiment, as shown in FIG. 6, control signal SG11 and control signal SG12, for controlling timing at which the switching elements S11 and S12 are switched on/off, are inverted signals of control signal SGa, for controlling timing at which switching elements SL1 and SCL1 are switched on/off.

Further, in the present embodiment, energy back flow is prevented by the diode D1, when an electrical potential at a connecting point of the secondary battery B1 and diode D1 is higher than an electrical potential at a connecting point of the switching element S11 and diode D1. Therefore, in the present embodiment, coil current IL1 never has a negative value.

Herein above, although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

The present application is based on Japanese Priority Application No. 2014-041558 filed on Mar. 4, 2014, the entire contents of which are hereby incorporated herein by reference.

What is claimed is:

1. A storage status adjusting circuit, comprising:
a first switching unit configured to switch between energy accumulation in a first coil and energy release from the first coil to any one of electric storage devices in a first assembled electric storage device having a plurality of the electric storage devices;
a second switching unit configured to switch between energy accumulation in a second coil and energy release from the second coil to any one of electric storage devices in a second assembled electric storage device having a plurality of the electric storage devices; and
a changing unit configured to change a potential difference between both ends of the first coil and a potential difference between both ends of the second coil based on storage statuses of the first assembled electric storage device and the second assembled electric storage device, when energy is accumulated in the first coil and the second coil,
wherein the energy accumulated in the first coil is released by operation of the first switching unit to any of the plurality of the electric storage devices in the first assembled electric storage device, and the energy accumulated in the second coil is released by operation of the second switching unit to any of the plurality of the electric storage devices in the second assembled electric storage device.

2. The storage status adjusting circuit according to claim 1, wherein the changing unit makes the potential difference between both ends of the first coil greater than the potential difference between both ends of the second coil when a lowest potential difference among potential differences of the respective electric storage devices in the first assembled electric storage device is less than, by a certain value or more, the lowest potential difference among potential differences of the respective electric storage devices in the second assembled electric storage device.

3. The storage status adjusting circuit according to claim 1, wherein the changing unit changes at least one of the potential differences between both ends of the first coil and between both ends of the second coil based on a result of comparing a potential difference between both ends of the first assembled electric storage device with a potential difference between both ends of the second assembled electric storage device.

4. The storage status adjusting circuit according to claim 1, wherein the first switching unit includes
a first changeover switching unit configured to change over between energy accumulation and energy release in the first coil; and
first control switching units, which correspond to the plurality of electric storage devices in the first assembled electric storage device, configured to control connection and disconnection between the plurality of electric storage devices in the first assembled electric storage device and the first coil;
wherein the second switching unit includes
a second changeover switching unit configured to change over between energy accumulation and energy release in the second coil; and
second control switching units, which correspond to the plurality of electric storage devices in the second assembled electric storage device, configured to control connection and disconnection between the plurality of electric storage devices in the second assembled electric storage device and the second coil.

5. The storage status adjusting circuit according to claim 4, wherein the first control switching unit has a first switching element connected between a positive electrode of one of the electric storage devices in the first assembled electric storage device and one end of the first coil;
the first switching element is controlled to switch based on a difference between an electric potential at the positive electrode of one of the electric storage devices and an electric potential at the one end of the first coil,
the second control switching unit has a second switching element connected between a positive electrode of one of the electric storage devices in the second assembled electric storage device and one end of the second coil; and
the second switching element is controlled to switch based on a difference between an electric potential at the positive electrode of one of the electric storage devices and an electric potential at the one end of the second coil.

6. The storage status adjusting circuit according to claim 4,
wherein the first changeover switching unit is controlled so as to let the first coil release energy when the potential difference between both ends of the first coil reaches a first certain value which corresponds to the potential difference between both ends of the first coil changed by the changing unit,
the second changeover switching unit is controlled so as to let the second coil release energy when the potential difference between both ends of the second coil reaches a second certain value which corresponds to the potential difference between both ends of the second coil changed by the changing unit.

7. A storage status adjusting device, comprising:
the storage status adjusting circuit according to claim 1;
the first coil; and
the second coil.

8. A storage battery pack, comprising:
a first coil;
a second coil;
a first assembled electric storage device having a plurality of electric storage devices;
a second assembled electric storage device having a plurality of the electric storage devices;
a first switching unit configured to switch between energy accumulation in the first coil and energy release from the first coil to any one of the electric storage devices in the first assembled electric storage device having the plurality of electric storage devices;
a second switching unit configured to switch between energy accumulation in the second coil and energy release from the second coil to any one of the electric storage devices in the second assembled electric storage device having the plurality of electric storage devices; and a changing unit configured to change a potential difference between both ends of the first coil and a potential difference between both ends of the second coil based on storage statuses of the first assembled electric storage device and the second assembled electric storage device, when energy is accumulated in the first coil and the second coil, wherein the energy accumulated in the first coil is released by operation of the first switching unit to any of the plurality of the electric storage devices in the first assembled electric storage device, and the energy accumulated in the second coil is released by operation of the second switching unit to any of the plurality of the electric storage devices in the second assembled electric storage device.

9. The storage battery pack according to claim 8, wherein the changing unit makes the potential difference between both ends of the first coil greater than the potential difference between both ends of the second coil when a lowest potential difference among potential differences of the respective electric storage devices in the first assembled electric storage device is less than, by a certain value or more, the lowest potential difference among potential differences of the respective electric storage devices in the second assembled electric storage device.

10. The storage battery pack according to claim 8, wherein the changing unit changes at least one of the potential differences between both ends of the first coil and between both ends of the second coil based on a result of comparing a potential difference between both ends of the first assembled electric storage device with a potential difference between both ends of the second assembled electric storage device.

11. The storage battery pack according to claim 8, wherein the first switching unit includes
a first changeover switching unit configured to change over between energy accumulation and energy release in the first coil; and
first control switching units, which correspond to the plurality of electric storage devices in the first assembled electric storage device, configured to control connection and disconnection between the plurality of electric storage devices in the first assembled electric storage device and the first coil;
wherein the second switching unit includes
a second changeover switching unit configured to change over between energy accumulation and energy release in the second coil; and
second control switching units, which correspond to the plurality of electric storage devices in the second assembled electric storage device, configured to control connection and disconnection between the plurality of electric storage devices in the second assembled electric storage device and the second coil.

12. The storage battery pack according to claim 11, wherein the first control switching unit has a first switching element connected between a positive electrode of one of the electric storage devices in the first assembled electric storage device and one end of the first coil;
the first switching element is controlled to switch based on a difference between an electric potential at the positive electrode of one of the electric storage devices and an electric potential at the one end of the first coil,
the second control switching unit has a second switching element connected between a positive electrode of one of the electric storage devices in the second assembled electric storage device and one end of the second coil; and
the second switching element is controlled to switch based on a difference between an electric potential at the positive electrode of one of the electric storage devices and an electric potential at the one end of the second coil.

13. The storage battery pack according to claim 11,
wherein the first changeover switching unit is controlled so as to let the first coil release energy when the potential difference between both ends of the first coil reaches a first certain value which corresponds to the potential difference between both ends of the first coil changed by the changing unit,
the second changeover switching unit is controlled so as to let the second coil release energy when the potential difference between both ends of the second coil reaches a second certain value which corresponds to the potential difference between both ends of the second coil changed by the changing unit.

14. A method of controlling a switch circuit, which includes
a first switching unit for switching between energy accumulation in a first coil and energy release from the first coil to any one of electric storage devices in a first assembled electric storage device having a plurality of the electric storage devices; and
a second switching unit for switching between energy accumulation in a second coil and energy release from the second coil to any one of the electric storage devices in a second assembled electric storage device having a plurality of the electric storage devices,
the method comprising the step of:
switching, by use of the first switching unit, between energy accumulation in the first coil and energy release from the first coil to any one of the electric storage devices in the first assembled electric storage device;
switching, by use of the second switching unit, between energy accumulation in the second coil and energy release from the second coil to any one of the electric storage devices in the second assembled electric storage device; and
changing a potential difference between both ends of the first coil and a potential difference between both ends of the second coil based on storage statuses of the first assembled electric storage device and the second assembled electric storage device, when energy is accumulated in the first coil and the second coil,
wherein the energy accumulated in the first coil is released by operation of the first switching unit to any of the plurality of the electric storage devices in the first assembled electric storage device, and the energy accumulated in the second coil is released by operation of the second switching unit to any of the plurality of the electric storage devices in the second assembled electric storage device.

* * * * *